(12) United States Patent
Codrescu et al.

(10) Patent No.: US 7,949,701 B2
(45) Date of Patent: May 24, 2011

(54) METHOD AND SYSTEM TO PERFORM SHIFTING AND ROUNDING OPERATIONS WITHIN A MICROPROCESSOR

(75) Inventors: Lucian Codrescu, Austin, TX (US); Erich Plondke, Austin, TX (US); Mao Zeng, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1107 days.

(21) Appl. No.: 11/498,604

(22) Filed: Aug. 2, 2006

(65) Prior Publication Data

US 2008/0034189 A1    Feb. 7, 2008

(51) Int. Cl.
   *G06F 7/38* (2006.01)
   *G06F 7/00* (2006.01)
   *G06F 15/00* (2006.01)

(52) U.S. Cl. ........ 708/551; 708/550; 708/209; 708/496; 708/497

(58) Field of Classification Search ........... 708/550–552
   See application file for complete search history.

(56) References Cited

U.S. PATENT DOCUMENTS

| | | | | |
|---|---|---|---|---|
| 4,999,801 A | * | 3/1991 | Katsuno | 708/500 |
| 5,844,827 A | * | 12/1998 | Wong | 708/209 |
| 5,930,159 A | * | 7/1999 | Wong | 708/550 |
| 6,099,158 A | | 8/2000 | Gorshtein | |
| 6,243,728 B1 | * | 6/2001 | Farooqui et al. | 708/209 |
| 6,889,242 B1 | * | 5/2005 | Sijstermans et al. | 708/551 |
| 2004/0267857 A1 | * | 12/2004 | Abel et al. | 708/524 |
| 2005/0125641 A1 | | 6/2005 | Ford | |
| 2006/0218380 A1 | * | 9/2006 | Boggs et al. | 712/218 |

OTHER PUBLICATIONS

International Search Report and Written Opinion—PCT/US2007/074639, International Search Authority—European Patent Office—Dec. 14, 2007.

* cited by examiner

*Primary Examiner* — Lewis A Bullock, Jr.
*Assistant Examiner* — Matthew Sandifer
(74) *Attorney, Agent, or Firm* — Nicholas J. Pauley; Peter M. Kamarchik; Jonathan T. Velasco

(57) ABSTRACT

A method and system to perform shifting and rounding operations within a microprocessor, such as, for example, a digital signal processor, during execution of a single instruction are described. An instruction to shift and round data within a source register unit of a register file structure is received within a processing unit. The instruction includes a shifting bit value indicating the bit amount for a right shift operation and is subsequently executed to shift data within the source register unit to the right by an encoded bit value, calculated by subtracting a single bit from the shifting bit value contained within the instruction. A predetermined bit extension is further inserted within the vacated bit positions adjacent to the shifted data. Subsequently, an addition operation is performed on the shifted data and a unitary integer value is added to the shifted data to obtain resulting data. Finally, the resulting data is further shifted to the right by a single bit value and a predetermined bit extension is inserted within the vacated bit position to obtain the final rounded data results to be stored within a destination register unit.

25 Claims, 6 Drawing Sheets

METHOD AND SYSTEM TO PERFORM SHIFTING AND ROUNDING OPERATIONS WITHIN A MICROPROCESSOR

BACKGROUND

1. Field of the Invention

The invention relates generally to microprocessors and, more specifically, to a method and system to perform shifting and rounding operations within a microprocessor, such as, for example, a digital signal processor, during execution of a single instruction.

2. Background

Typically, computer systems include one or more microprocessor devices, each microprocessor device being configured to perform operations on values stored within a memory of the computer system and to manage the overall operation of the computer system. These computer systems may also include various multimedia devices, such as, for example, sound cards and/or video cards, each multimedia device further including one or more processors, such as, for example, digital signal processors (DSPs), which perform complex mathematical computations within each respective multimedia device.

A digital signal processor (DSP) typically includes hardware execution units specifically configured to perform such mathematical calculations, such as, for example, one or more arithmetic logic units (ALU), one or more multiply-and-accumulate units (MAC), and other functional units configured to perform operations specified by a set of instructions within the DSP. Such operations may include, for example, arithmetic operations, logical operations, and other data processing operations, each being defined by an associated set of instructions.

Generally, the execution units within the DSP read data and operands from a register file coupled to the memory and to the execution units, perform the instruction operations, and store the results into the register file. The register file includes multiple register units, each register unit being accessible as a single register or as aligned pairs of two adjacent register units. Within each register unit, the execution units may perform, for example, specific data shifting and rounding operations using known shifting and rounding modules.

SUMMARY

A method and system to perform shifting and rounding operations within a microprocessor, such as, for example, a digital signal processor, during execution of a single instruction are described. In one embodiment, an instruction to shift and round data within a source register unit of a register file structure is received within a processing unit. The instruction includes a shifting bit value indicating the bit amount for a right shift operation and is subsequently executed to shift data within the source register unit to the right by an encoded bit value, calculated by subtracting a single bit from the shifting bit value contained within the instruction. A predetermined bit extension is further inserted within the vacated bit positions adjacent to the shifted data.

Subsequently, in one embodiment, an addition operation is performed on the shifted data and a unitary integer value is added to the shifted data to obtain resulting data. Finally, the resulting data is further shifted to the right by a single bit value and a predetermined bit extension is inserted within the vacated bit position to obtain the final rounded data results to be stored within a destination register unit.

DETAILED DESCRIPTION

A method and system to perform shifting and rounding operations within a microprocessor, such as, for example, a digital signal processor (DSP), during execution of a single instruction are described. The system described in detail below is an algorithm which enables a DSP to perform data shifting and rounding operations within a register unit without the need for a rounding module within the execution unit, thus delivering inexpensive and streamlined data manipulation operations within the DSP. Although the system is described in detail below in connection with a DSP, it is to be understood that the system may be implemented using a microprocessor device, or any other processing unit capable of shifting and rounding data during execution of a single instruction.

Typically, a processing unit within the DSP is configured to perform operations specified by a set of instructions within the DSP. Such operations may include, for example, arithmetic operations, logical operations, and other data processing operations, each being defined by an associated set of instructions and each being implemented, for example, as a succession of data shifting and rounding operations performed by respective modules within the processing unit.

In one embodiment, the processing unit receives an instruction to shift data within a source register unit of a register file structure and to round the data to a next integer value. The instruction includes a right shift operator and a rounding operator and further specifies encoding information for the source register unit, encoding information for a destination register unit to store the data results, and a shifting bit value indicating the bit amount for the right shift operation.

In one embodiment, the processing unit further executes the instruction to perform an initial arithmetic right shift on data within the source register unit by an encoded bit value, calculated by subtracting a single bit from a shifting bit value specified within the instruction. A predetermined bit extension is further inserted within the vacated bit positions adjacent to the shifted data, the bit extension preserving the positive or negative sign of the processed data.

Subsequently, in one embodiment, the instruction performs an addition operation on the shifted data by adding a unitary integer value to the shifted data to obtain resulting data. Finally, the instruction performs a further right shifting operation on the resulting data by a single bit value and inserts a predetermined bit extension into the vacated bit position to obtain the final rounded data results to be stored within the destination register unit.

Figure 1:
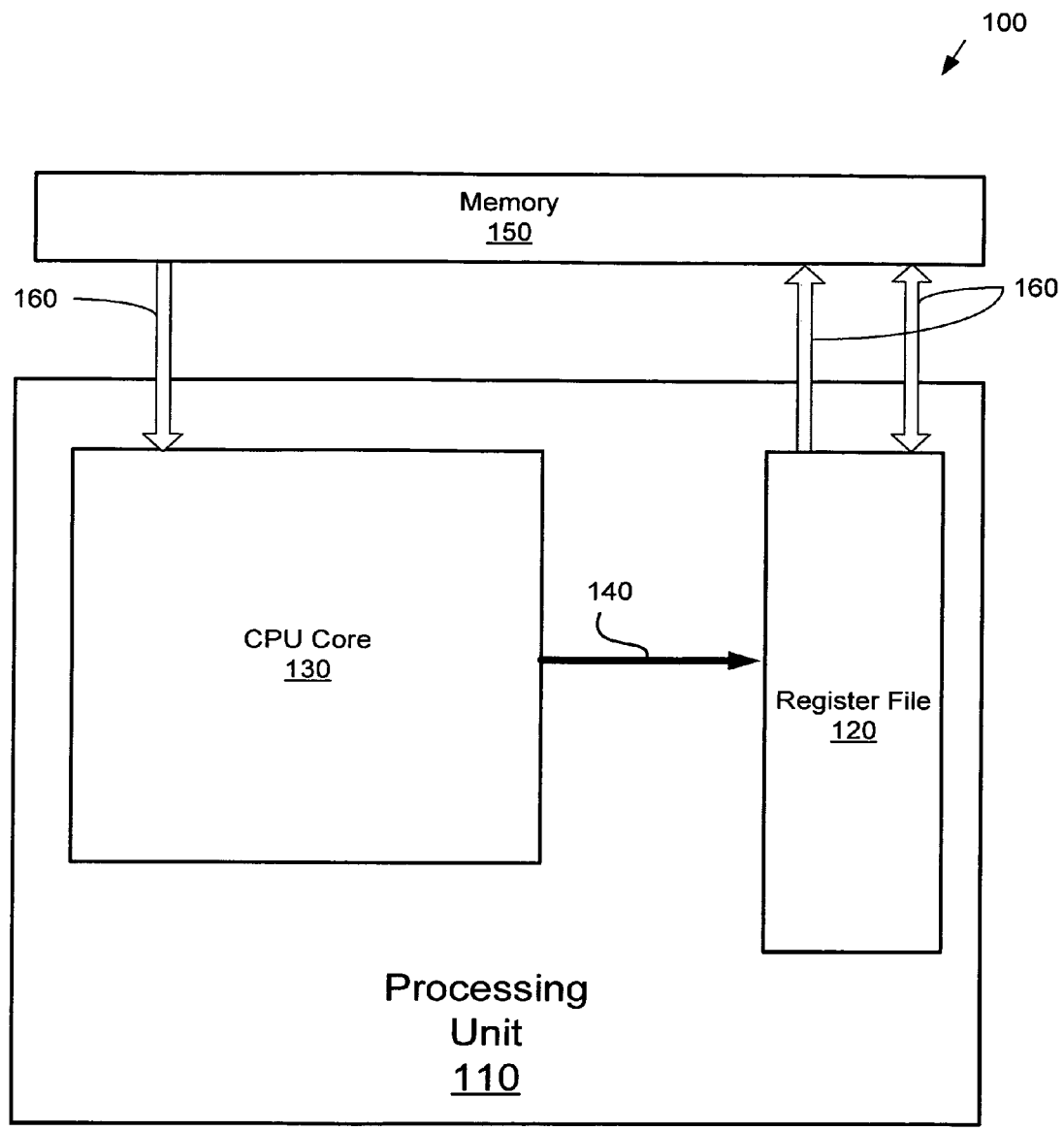
FIG. 1 is a block diagram of a digital signal processing system within which a set of instructions may be executed.

FIG. 1 is a block diagram of a digital signal processing system within which a set of instructions may be executed. As illustrated in FIG. 1, the digital signal processing system 100 includes a processing unit 110, a memory 150, and one or more buses 160 coupling the processing unit 110 to the memory 150.

The memory 150 stores data and instructions, such as, for example, in the form of VLIW packets produced by a VLIW compiler, each VLIW packet comprising one or more instructions. Each instruction of a packet is typically of a predetermined width and has a particular address in the memory 150, such that a first instruction in a packet typically has a lower memory address than a last instruction of the packet. Addressing schemes for a memory are well known in the art and are not discussed in detail here. Instructions in the memory 150 are loaded into the processing unit 110 via buses 160.

The processing unit 110 further comprises a central processing unit core 130 coupled to one or more register file structures 120 via one or more pipelines 140. The processing unit 110 may further comprise one or more microprocessors, digital signal processors, or the like.

The register file 120 further comprises a set of general register units, which support general purpose computations, and which are described in further detail below in connection with FIG. 2, and a set of control register units, which support special-purpose functionality, such as, for example, hardware loops, predicates, and other special operands.

Figure 2:
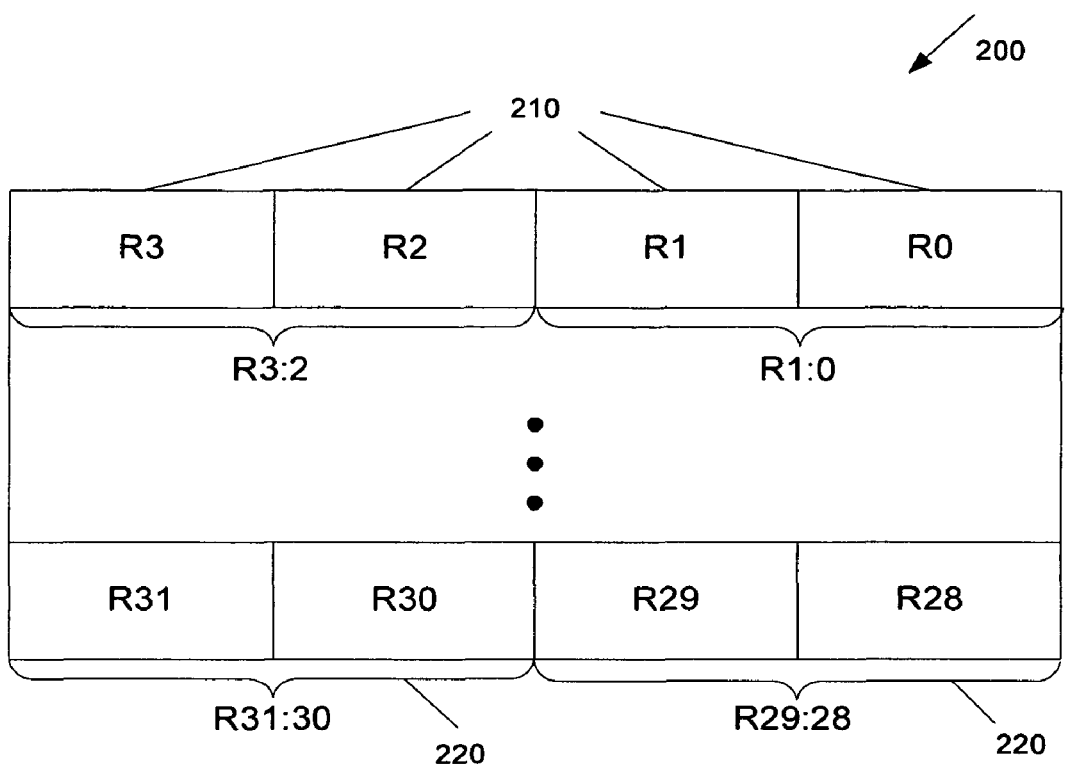
FIG. 2 is a block diagram illustrating one embodiment of a general register structure within the digital signal processing system.

FIG. 2 is a block diagram illustrating one embodiment of a general register structure within the digital signal processing system. As illustrated in FIG. 2, in one embodiment, the general register file structure 200 within the register file 120 includes multiple register units, such as, for example, thirty two 32-bit wide register units 210, each register unit being accessible as a single register or as aligned pairs 220 of two adjacent register units 210.

The general register units 210 can be referred to by multiple names based on the appropriate instruction. For example, register units 210 may be individually referred to as $R_0, R_1, \ldots, R_{30}$, and $R_{31}$. In addition, register units $R_0$ and $R_1$ may form a 64-bit register pair 220 referred to as $R_{1:0}$. Similarly, register units $R_2$ and $R_3$ may form a 64-bit register pair 220 referred to as $R_{3:2}$, register units $R_{28}$ and $R_{29}$ may form a 64-bit register pair 220 referred to as $R_{29:28}$, and register units $R_{30}$ and $R_{31}$ may form a 64-bit register pair 220 referred to as $R_{31:30}$.

In one embodiment, general register units 210 are used for general computational purposes, such as, for example, address generation, scalar arithmetic, and vector arithmetic, and provide all operands for instructions, including addresses for load/store instructions, data operands for numeric instructions, and vector operands for vector instructions. Each register unit 210 further includes a most significant half word unit, containing data located in a high portion of the register unit 210, and a least significant half word unit, containing data located in a low portion of the register unit 210. Considering, for example, a 32-bit wide register unit 210, the most significant half word unit and the least significant half word unit of the register unit 210 are both 16-bit wide units.

Figure 3:
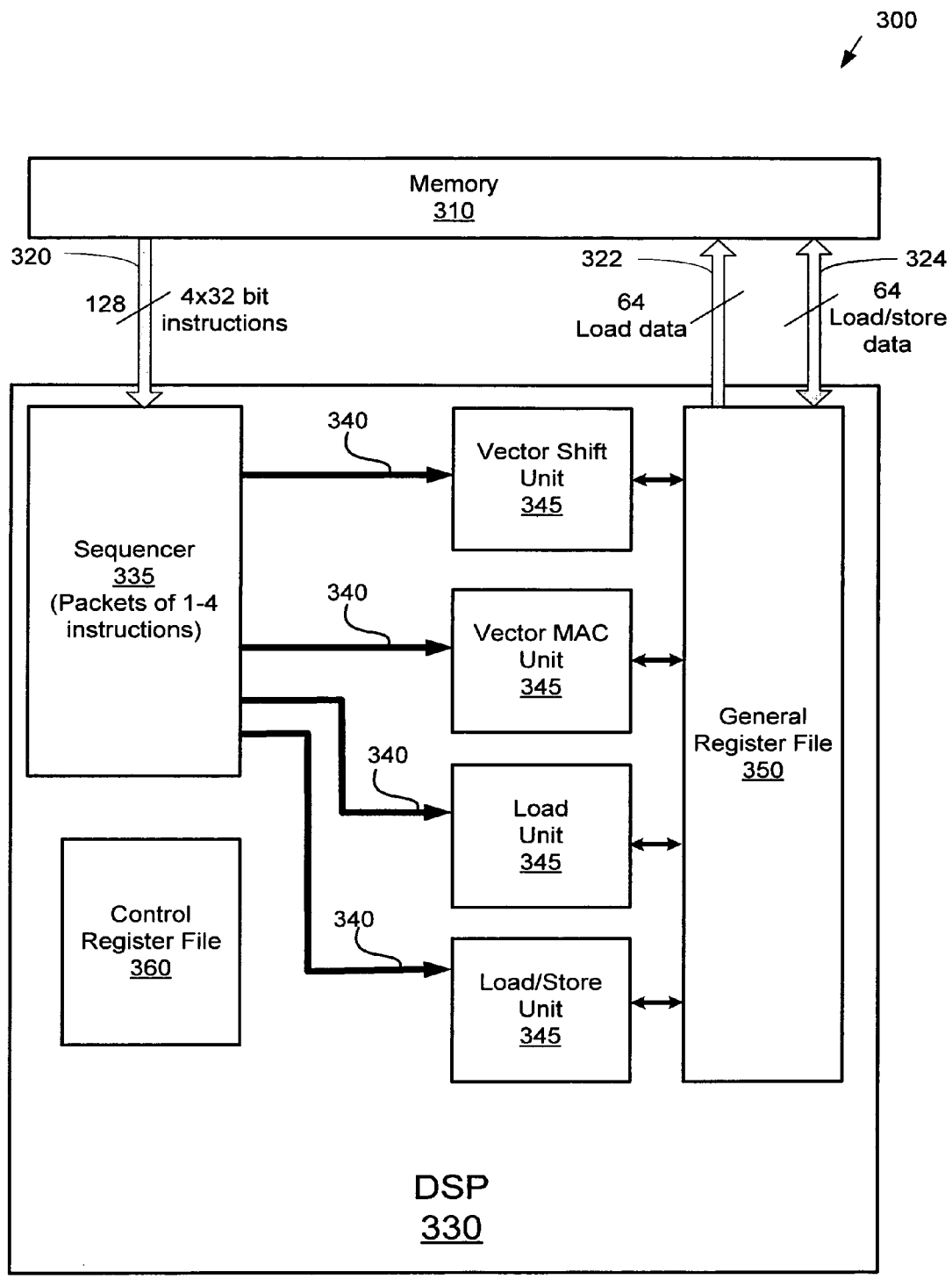
FIG. 3 is a block diagram illustrating one embodiment of a Very Long Instruction Word (VLIW) digital signal processing system architecture.

FIG. 3 is a block diagram illustrating one embodiment of a Very Long Instruction Word (VLIW) digital signal processing system architecture. The VLIW system architecture 300 includes a memory 310 coupled to a digital signal processor (DSP) 330 via an instruction load bus 320, a data load bus 322, and a data load/store bus 324.

In one embodiment, the memory 310 stores data and instructions, for example in the form of VLIW packets having one to four instructions. Instructions stored within the memory 310 are loaded to the DSP 330 via the instruction load bus 320. In one embodiment, each instruction has a 32-bit word width which is loaded to the DSP 330 via a 128-bit instruction load bus 320 having a four word width. In one embodiment, the memory 310 is a unified byte-addressable memory, has a 32-bit address space storing both instructions and data, and operates in little-endian mode.

In one embodiment, the DSP 330 comprises a sequencer 335, four pipelines 340 for four processing or execution units 345, a general register file structure 350 (comprising a plurality of general register units), such as, for example, the general register file structure 200 described in detail in connection with FIG. 2, and a control register file structure 360. The sequencer 335 receives packets of instructions from the memory 310 and determines the appropriate pipeline 340 and respective execution unit 345 for each instruction of each received packet using the information contained within the instruction. After making this determination for each instruction of a packet, the sequencer 335 inputs the instructions into the appropriate pipeline 340 for processing by the appropriate execution unit 345.

In one embodiment, the execution units 345 further comprise a vector shift unit, a vector MAC unit, a load unit, and a load/store unit. The vector shift unit 345 executes, for example, S-type (Shift Unit) instructions, such as Shift & Add/Sub operations, Shift & Logical operations, Permute operations, Predicate operations, Bit Manipulation, and Vector Halfword/Word shifts, A64-type (64-bit Arithmetic) instructions, such as 64-bit Arithmetic & Logical operations, 32-bit Logical operations, Permute operations, A32-type (32-bit Arithmetic) instructions, such as 32-bit Arithmetic operations, J-type (Jump) instructions, such as Jump/Call PC-relative operations, and CR-type (Control Register) instructions, such as Control Register transfers, Hardware Loop setup. The vector MAC unit 345 executes, for example, M-type (Multiply Unit) instructions, such as Single Precision, Double Precision, Complex, and Vector Byte/Halfword instructions, A64-type instructions, A32-type instructions, J-type instructions, and JR-type (Jump Register) instructions, such as Jump/Call Register operations. The load unit 345 loads data from the memory 310 to the general register file structure 350 and executes, for example, load-type and A32-type instructions. The load/store unit 345 loads and stores data from the general register file structure 350 back to the memory 310 and executes, for example, load-type, store-type, and A32-type instructions.

Each execution unit 345 that receives an instruction performs the instruction using the general register file structure 350 that is shared by the four execution units 345. Data needed by an instruction is loaded to the general register file structure 350 via the 64-bit data load bus 322. After the instructions of a packet are performed by the execution units 345, the resulting data is stored to the general register file structure 350 and then loaded and stored to the memory 310 via the 64-bit data load/store bus 324. Typically, the one to four instructions of a packet are performed in parallel by the four execution units 345 in one clock cycle, where a maximum of one instruction is received and processed by a pipeline 340 for each clock cycle.

In one embodiment, an execution unit 345 may also use the control register file structure 360 to execute a corresponding instruction. The control register file structure 360 comprises a set of special register units, such as, for example, modifier, status, and predicate register units.

Figure 4:
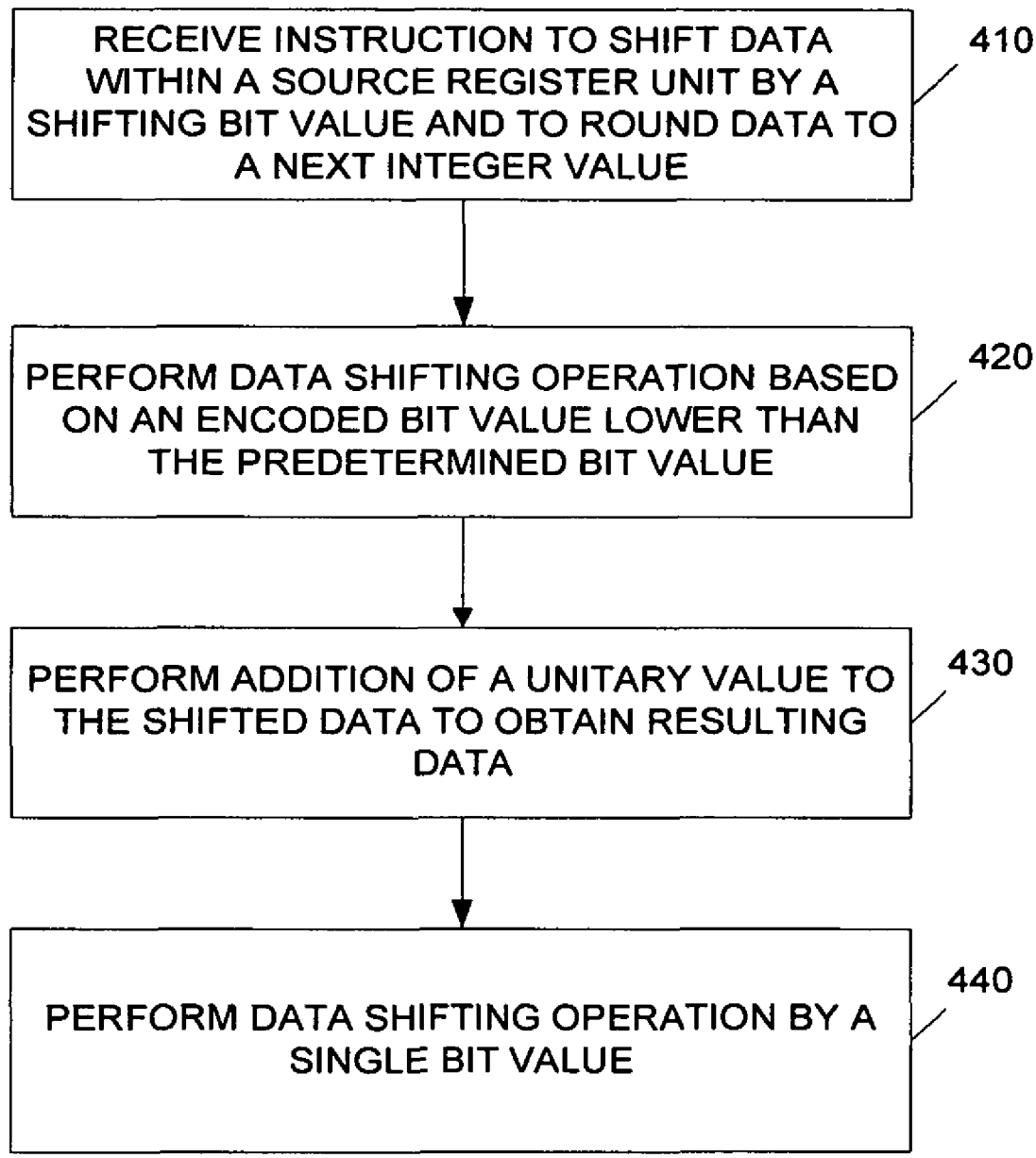
FIG. 4 is a flow diagram illustrating one embodiment of a method to shift and round data within a register unit of the digital signal processing system.

FIG. 4 is a flow diagram illustrating one embodiment of a method to shift and round data within a register unit of the digital signal processing system 100. As illustrated in the embodiment of FIG. 4, at processing block 410, an instruction to shift data stored within a source register unit 210 of the digital signal processing system 300 and to further round the data results to a next integer value is received. In one embodiment, the execution unit 345 within the DSP 330 receives the instruction and further executes the instruction, as described in detail below.

The instruction may be executed, for example, to implement an arithmetic operation on the stored data, such as, for example, a division by a predetermined factor followed by rounding of the division result to the next higher integer value and storing of the final rounded data results within the destination register unit. Alternatively, the instruction may be executed to implement other mathematical calculations, such as, for example, other arithmetic operations, logical operations, or data processing operations. In one embodiment, the instruction includes the shifting bit value, which specifies the number of bits necessary to perform a right shift operation on the data stored within the source register unit 210.

At processing block 420, data shifting based on an encoded bit value lower than the shifting bit value is performed. In one embodiment, the encoded bit value is calculated by subtracting a single bit from the shifting bit value, and specifies the immediate number of bits necessary to perform the right shift operation.

In one embodiment, the execution unit 345 communicates with the general register file structure 350 and identifies the source register unit 210. Then, the execution unit 345 calculates the encoded bit value and performs an arithmetic right shift operation on data stored within the source register unit 210 based on the encoded bit value. Subsequent to the data shifting operation, the execution unit 345 further inserts a predetermined bit extension in vacated bit positions adjacent to the shifted data within the register unit 210. The predetermined bit extension preserves the positive or negative value of the data stored within the register unit 210 and is inserted either as a 0 or 1 succession of bit values for the respective positive or negative sign of the stored data.

At processing block 430, an addition of a unitary integer value to the shifted data within the register unit is performed. In one embodiment, the execution unit 345 performs an addition operation on the shifted data, such as, for example, a 32-bit addition of a positive +1 value to the shifted data within the register unit 210 to obtain resulting data.

At processing block 440, further data shifting by a single bit value is performed. In one embodiment, the execution unit 345 performs a second right shifting operation on the resulting data by a single bit to obtain the final rounded data results. Subsequent to the data shifting operation, the execution unit 345 further inserts a predetermined 1-bit extension in the vacated bit position within the register unit 210. In one embodiment, the predetermined bit extension preserves the positive or negative value of the resulting data stored within the register unit 210 and is inserted either as a 0 or a 1 value.

Figure 5:
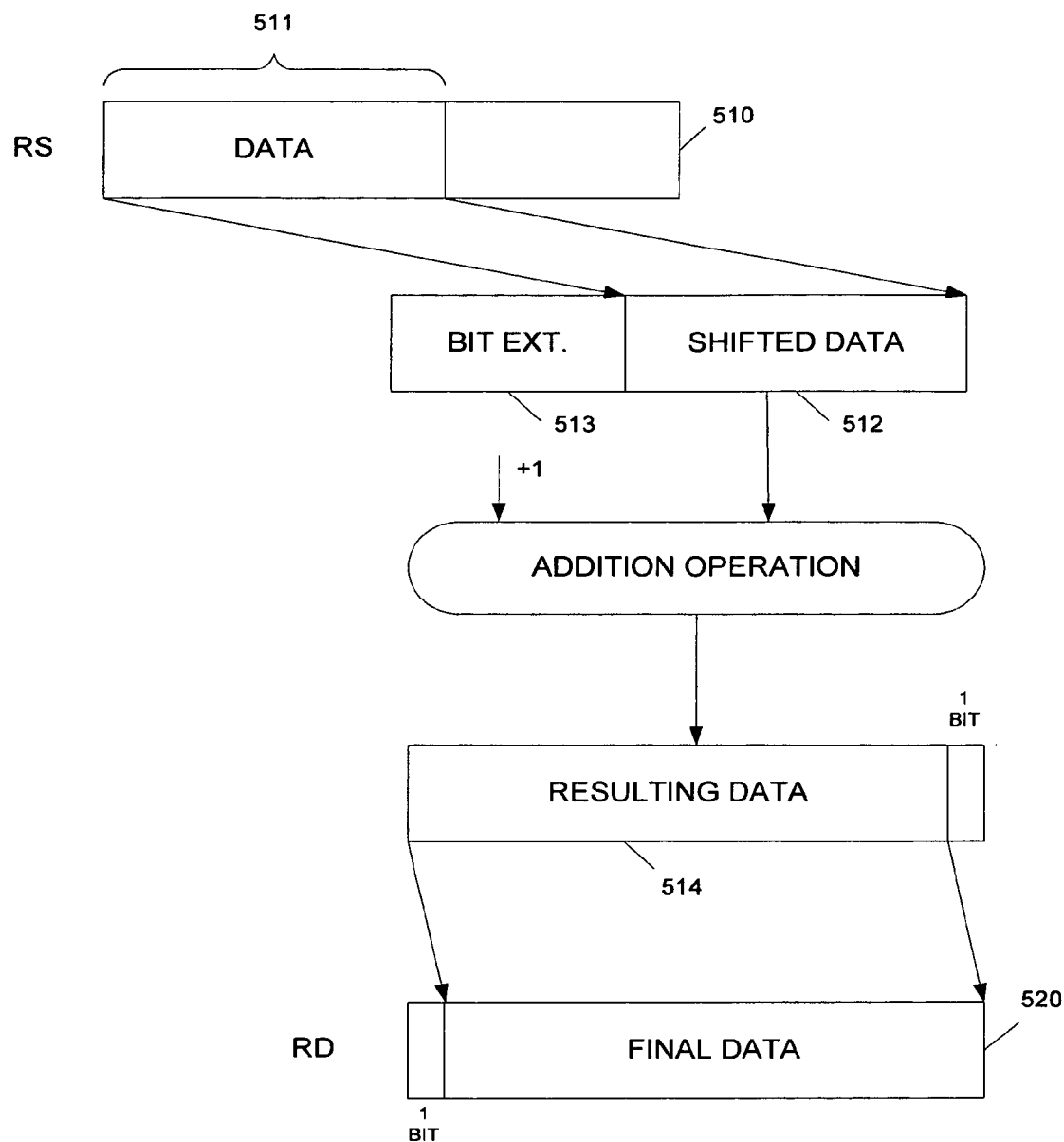
FIG. 5 is a block diagram illustrating the method to shift and round data within a register unit of the digital signal processing system, as described in connection with FIG. 4.

FIG. 5 is a block diagram illustrating the method to shift and round data described in connection with FIG. 4. As illustrated in FIG. 5, a source register unit $R_S$ 510 is identified and retrieved from the general register file structure 200.

In one embodiment, the instruction to shift and round data within the source register unit $R_S$ 510 into a resulting destination register unit $R_D$ 520 is:

$R_D$=asr ($R_S$, #U): rnd where "asr" is the arithmetic right shift operator, "#U" is the shifting bit value for the arithmetic right shift operation, and "rnd" is the rounding operator. The associated behavior of the above instruction may be represented, in one embodiment, as $R_D$=(($R_S$>>(#U−1))+1)>>1, which shows that data in the source register unit $R_S$ 510 is first shifted to the right by an encoded bit value (#U−1), lower by a single bit than the shifting bit value #U contained within the instruction, then a +1 integer value is added to the shifted data to obtain resulting data, and, finally, the resulting data is again shifted to the right by a single bit to obtain the final rounded data results to be stored within the destination register unit $R_D$ 520.

In one example, if data within the source register unit $R_S$ 510 is an integer value, such as, for example, the number 7, having a binary representation 0111, and if the arithmetic operation to be performed on such data is a division by 2, which translates into a shifting operation to the right by a shifting bit value 1, followed by a rounding operation for the resulting data 7/2=3.5 to obtain a final rounded integer value of 4, then the instruction may be represented as $R_D$=asr (0111, #0): rnd. As shown in FIG. 5, upon execution of the instruction, data 511 within the source register unit $R_S$ 510, such as, for example, the 0111 binary representation of the integer value 7, is shifted to the right based on an encoded bit value calculated by subtracting 1 from the desired shift amount. For the desired shift of #1, the encoded value should be #0. A predetermined bit extension 513 is then inserted within the vacated bit positions adjacent to the shifted data 512. In this case, no insertion is necessary because the encoded bit value is 0.

Subsequently, a 32-bit addition operation is performed on the shifted data 512 and a +1 value is added to the shifted data 512 to obtain resulting data 514. In one embodiment, the shifted data 512 is still a 7 value, having a binary representation of 0111, and, subsequent to the addition, the resulting data 514 is 7+1=8, having a binary representation of 1000.

Finally, the resulting data 514 is further shifted to the right by a single bit and a predetermined bit extension is inserted within the vacated bit position to obtain the final data within the destination register unit 520. In one embodiment, the binary representation 1000 is further shifted to the right by a single bit and a predetermined 1-bit extension of a 0 value is inserted within the vacated bit position to preserve the positive aspect of the initial data 511, resulting in a binary representation 0100, which represents the number 4, the final rounded integer value to be stored within the destination register unit $R_D$ 520.

Figure 6:
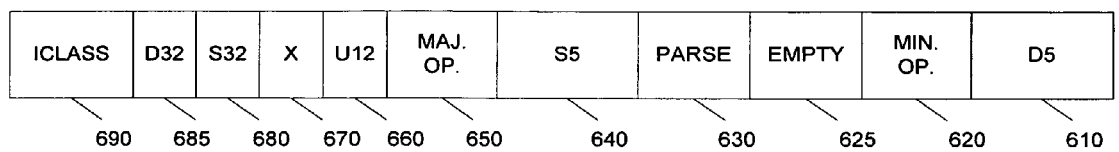
FIG. 6 is a block diagram of one embodiment of an instruction to shift and round data within a register unit of the digital signal processing system.

FIG. 6 is a block diagram of one embodiment of an instruction to shift and round data within a register unit of the digital signal processing system. As illustrated in FIG. 6, in one embodiment, the instruction described in connection with FIG. 5 includes multiple fields, such as, for example, a 5-bit field 610 containing information necessary to encode the destination register unit $R_D$, a 3-bit field 620 containing minor operation code information necessary to identify the instruction to be executed, an empty 6-bit field 625 reserved for future encoding, a 2-bit field 630 containing packet/loop parsing bit information, a 5-bit field 640 containing information necessary to encode the source register unit $R_S$, a 3-bit field 650 containing major operation code information necessary to identify the instruction to be executed, a 1-bit field 660 containing the predetermined shifting bit value, a 1-bit field 670 containing destination information for data results, 1-bit fields 680 and 685 containing information related to the respective register types (either 32-bit or 64-bit wide) of the source and destination register units, and a 4-bit field 690 containing instruction class information, for a total of 32 bits.

Alternatively, however, other additional fields may also be included within the encoding of the above instructions without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or a combination of electronic hardware and computer software. To illustrate this, various illustrative components, blocks, modules, circuits, and steps have been described above generally in terms of their functionality. Whether such functionality is implemented as hardware or a combination of hardware and software depends upon the particular application and design constraints imposed on the overall system. Skilled artisans may implement the described functionality in varying ways for each particular application, but such implementation decisions should not be interpreted as causing a departure from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A non-transitory computer readable medium comprising:
an instruction of a plurality of executable instructions contained within the medium, which, when executed in a processing system, causes the processing system to shift data to the right within a source register unit of a register file structure based on an encoded bit value, wherein the encoded bit value is determined by subtracting one from a variable unsigned shifting bit value specified within the instruction and to further round the data to a next integer value by adding a unitary integer value to the shifted data to obtain resulting data, and right shifting the resulting data by a single bit value independent of the sign of the unsigned shifting bit value.

2. The computer readable medium according to claim 1, wherein execution of the instruction further causes the processing system to insert a predetermined bit extension within vacated bit positions adjacent to the shifted data.

3. The computer readable medium according to claim 1, wherein execution of the instruction further causes the processing system to insert a predetermined bit extension within a vacated bit position adjacent to the resulting data to obtain final data within a destination register unit.

4. The computer readable medium according to claim 1, wherein the source register unit is a 32-bit wide register unit and a resulting destination register unit is a 32-bit wide register unit.

5. The computer readable medium according to claim 1, wherein the source register unit is a 64-bit wide register unit and a resulting destination register unit is a 64-bit wide register unit.

6. The computer readable medium according to claim 1, wherein the plurality of executable instructions includes a very long instruction word packet having one or more executable instructions, wherein when the one or more executable instructions are received by a sequencer, the sequencer delivers each executable instruction to one or more corresponding pipelines and to one or more corresponding execution units, wherein the one or more executable instructions are delivered in parallel in one clock cycle, and wherein the one or more executable instructions cause the one or more corresponding execution units to shift the data within the source register unit of the register file structure.

7. The computer readable medium according to claim 6, wherein the very long instruction word packet comprises one to four executable instructions and wherein the sequencer delivers each executable instruction to one of four corresponding pipelines and to one of four corresponding execution units.

8. A method of performing a shifting and rounding operation at a processor, the method comprising:
receiving an executable instruction at the processor; and
executing the executable instruction at the processor to shift data to the right within a source register unit of a register file structure based on an encoded bit value that is determined by subtracting one from a variable unsigned shifting bit value specified within the executable instruction and to further round the data to a next integer value by adding a unitary integer value to the shifted data to obtain resulting data, and right shifting the resulting data by a single bit value to obtain final data stored within a destination register unit.

9. The method according to claim 8, wherein the executing further comprises inserting a predetermined bit extension within vacated bit positions adjacent to said the shifted data.

10. The method according to claim 8, wherein the executing further comprises inserting a predetermined bit extension within a vacated bit position adjacent to the resulting data to obtain the final data.

11. The method according to claim 8, wherein the source register unit is a 32-bit wide register unit and a resulting destination register unit is a 32-bit wide register unit.

12. The method according to claim 8, wherein the source register unit is a 64-bit wide register unit and a resulting destination register unit is a 64-bit wide register unit.

13. The method according to claim 8, wherein the executable instruction is a division instruction.

14. An integrated circuit comprising:
a memory to store packets comprising instructions; and
a processor coupled to the memory, the processor comprising a processing unit and a register file structure coupled to the processing unit;
wherein the processing unit is configured to receive an executable instruction and to execute the executable instruction to shift data to the right within a source register unit of the register file structure based on an encoded bit value, wherein the encoded bit value is determined by subtracting one from a variable unsigned shifting bit value specified within the executable instruction and to further round the data to a next integer value by adding a unitary integer value to the shifted data to obtain resulting data, and right shifting the resulting data by a single bit value to obtain final data stored within a destination register unit.

15. The circuit according to claim 14, wherein the processing unit further inserts a predetermined bit extension within vacated bit positions adjacent to the shifted data.

16. The circuit according to claim 14, wherein the processing unit further inserts a predetermined bit extension within a vacated bit position adjacent to the resulting data to obtain the final data.

17. The circuit according to claim 14, wherein the source register unit is a 32-bit wide register unit and a resulting destination register unit is a 32-bit wide register unit.

18. The circuit according to claim 14, wherein the source register unit is a 64-bit wide register unit and a resulting destination register unit is a 64-bit wide register unit.

19. The circuit according to claim 14, wherein the executable instruction is a division instruction.

20. An apparatus comprising:
means for receiving an executable instruction; and
means for executing the executable instruction to shift data to the right within a source register unit of a register file structure based on an encoded bit value, wherein the encoded bit value is determined by subtracting one from a variable unsigned shifting bit value specified within the instruction and to further round the data to a next integer value by adding a unitary integer value to the shifted data to obtain resulting data, and right shifting the resulting data by a single bit value independent of the sign of the unsigned shifting bit value.

21. The apparatus according to claim 20, further comprising means for inserting a predetermined bit extension within vacated bit positions adjacent to the shifted data.

22. The apparatus according to claim 20, further comprising means for inserting a predetermined bit extension within a vacated bit position adjacent to the resulting data to obtain the final data.

23. The apparatus according to claim 20, wherein the source register unit is a 32-bit wide register unit and the resulting destination register unit is a 32-bit wide register unit.

24. The apparatus according to claim 20, wherein the source register unit is a 64-bit wide register unit and the resulting destination register unit is a 64-bit wide register unit.

25. The apparatus according to claim 20, wherein the executable instruction is a division instruction.

* * * * *